(12) United States Patent
Secord et al.

(10) Patent No.: US 10,081,307 B2
(45) Date of Patent: Sep. 25, 2018

(54) PERSONAL WEATHER PROTECTOR DEVICE HOLDERS FOR VEHICLES AND VEHICLES INCLUDING THE SAME

(71) Applicant: Toyota Motor Engineering & Manufacturing North America, Inc., Erlanger, KY (US)

(72) Inventors: Nathaniel Secord, Toledo, OH (US); Cassandra R. Grant, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/196,637

(22) Filed: Jun. 29, 2016

(65) Prior Publication Data
US 2018/0001829 A1    Jan. 4, 2018

(51) Int. Cl.
*B60R 7/12*    (2006.01)

(52) U.S. Cl.
CPC ..................... *B60R 7/12* (2013.01)

(58) Field of Classification Search
CPC ............. B60R 7/12; B60R 2011/0003; B60R 2011/0005; B60R 2011/0019; B60R 2011/0021; B60R 2011/002
USPC ......... 296/37.8, 37.13–37.16, 37.1, 37.7, 38, 296/1.07, 1.08; 224/915
See application file for complete search history.

(56) References Cited

U.S. PATENT DOCUMENTS

| | | | | |
|---|---|---|---|---|
| 1,892,601 A | * | 12/1932 | Beehler | B60R 7/12 211/63 |
| 1,904,510 A | * | 4/1933 | Mott | B60R 7/12 135/34.2 |
| 2,853,219 A | * | 9/1958 | Schwartz | B60R 7/12 224/275 |
| 3,081,126 A | * | 3/1963 | Theberge | B60R 7/12 224/544 |
| 3,124,287 A | * | 3/1964 | Belzer | B60R 7/12 211/63 |

(Continued)

FOREIGN PATENT DOCUMENTS

| | | |
|---|---|---|
| DE | 102005059728 | 6/2007 |
| JP | H0899585 | 4/1996 |

(Continued)

OTHER PUBLICATIONS http://www.core77.com/posts/27355/designing-for-drivers-organizing-the-car-27355, dated Jul. 31, 2014.

(Continued)

*Primary Examiner* — Gregory A Blankenship
(74) *Attorney, Agent, or Firm* — Dinsmore & Shohl LLP (57) ABSTRACT

A vehicle includes a vehicle assembly component and a personal weather protector device holder having a device entrance opening provided in the vehicle assembly component. The personal weather protector device holder providing a device holding volume that receives a personal weather protector device through the device entrance opening. The device entrance opening includes an enlarged opening portion and a bridge opening portion that intersects the enlarged opening portion. The enlarged opening portion of the device entrance opening having a width that is greater than a width of the bridge opening portion.

18 Claims, 6 Drawing Sheets

(56) References Cited

U.S. PATENT DOCUMENTS

| | | | | |
|---|---|---|---|---|
| 4,378,888 A * | 4/1983 | Reed | ............... | A45B 25/28 211/62 |
| 4,700,848 A * | 10/1987 | Fujiki | ............... | A45B 25/28 211/63 |
| 4,807,920 A * | 2/1989 | Fujiki | ............... | B60R 7/12 211/63 |
| 5,129,615 A * | 7/1992 | Strauss | ............... | B60R 7/12 206/564 |
| 5,358,307 A * | 10/1994 | Shafer | ............... | B60R 7/043 224/275 |
| 5,716,091 A | 2/1998 | Wieczorek | | |
| 5,800,004 A | 9/1998 | Ackeret | | |
| 5,865,502 A | 2/1999 | Ayers et al. | | |
| D505,379 S * | 5/2005 | Castator | ............... | D12/415 |
| 7,322,500 B2 | 1/2008 | Maierholzner | | |
| 7,594,686 B2 * | 9/2009 | Augustyn | ............... | B60R 7/12 296/146.7 |
| 8,387,640 B2 | 3/2013 | Kim | ............... | A45B 11/00 135/88.07 |
| 8,979,160 B1 * | 3/2015 | Pericak | ............... | E05B 47/0001 224/483 |
| 2004/0041425 A1 * | 3/2004 | Collavo | ............... | B60R 7/12 296/37.8 |
| 2004/0084922 A1 * | 5/2004 | Park | ............... | B60R 7/12 296/37.13 |
| 2005/0173483 A1 * | 8/2005 | Ravikumar | ............... | B60R 7/12 224/483 |
| 2006/0028043 A1 | 2/2006 | Zeidman | | |
| 2007/0241582 A1 * | 10/2007 | McKeever | ............... | B60R 7/12 296/37.12 |
| 2009/0001749 A1 * | 1/2009 | Johnson | ............... | B60R 7/12 296/37.15 |
| 2013/0057012 A1 * | 3/2013 | Blackmore | ............... | B60K 37/04 296/37.13 |
| 2013/0088035 A1 * | 4/2013 | Cha | ............... | B60R 19/48 296/37.1 |
| 2015/0130207 A1 * | 5/2015 | Bisson | ............... | B60R 21/04 296/37.1 |
| 2015/0360620 A1 * | 12/2015 | Leo | ............... | B60R 11/06 224/522 |

FOREIGN PATENT DOCUMENTS

| | | | | |
|---|---|---|---|---|
| JP | 2007-308108 | * | 11/2007 | ............... B60R 7/12 |
| KR | 20110007458 | | 7/2011 | |
| KR | 20120138315 | | 12/2012 | |

OTHER PUBLICATIONS http://www.chinawholesaletown.com/Buy-Products/Umbrella-Draining-Solution,-Your-car-stays-dry-with-this-umbrella-holder-Suppliers_240193/, undated.

http://www.volvocars.com/nz/cars/new-models/v40/specifications, undated.

http://senseworldwide.com/blog/5-lessons-in-luxury-car-design-from-the-guys-who-park-them/, dated Jun. 18, 2013.

* cited by examiner

PERSONAL WEATHER PROTECTOR DEVICE HOLDERS FOR VEHICLES AND VEHICLES INCLUDING THE SAME

TECHNICAL FIELD

The present specification generally relates to personal weather protector device holders and, more specifically, personal weather protector device holders for vehicles that can hold personal weather protector devices, such as umbrellas and snow brushes.

BACKGROUND

Personal weather protector devices include umbrellas and snow brushes. Many vehicle occupants would prefer to utilize such personal weather protector devices upon exiting a vehicle. However, it can be inconvenient to transport such personal weather protector devices in the vehicle. For example, the personal weather protector devices may occupy space within a cabin of the vehicle. Additionally, immediately after use, the personal weather protector devices may be wet and soiled, which can transfer to an interior of the vehicle when placed in the cabin.

Accordingly, a need exists for personal weather protector device holders for vehicles that can hold personal weather protector devices, such as umbrellas and snow brushes.

SUMMARY

In one embodiment, a vehicle includes a vehicle assembly component and a personal weather protector device holder having a device entrance opening provided in the vehicle assembly component. The personal weather protector device holder providing a device holding volume that receives a personal weather protector device through the device entrance opening. The device entrance opening includes an enlarged opening portion and a bridge opening portion that intersects the enlarged opening portion. The enlarged opening portion of the device entrance opening having a width that is greater than a width of the bridge opening portion.

In another embodiment, a personal weather protector device holder that connects to a vehicle assembly component includes a device holder housing having a device entrance opening. The personal weather protector device holder provides a device holding volume that receives a personal weather protector device through the device entrance opening. The device entrance opening includes an enlarged opening portion and a bridge opening portion that intersects the enlarged opening portion. The enlarged opening portion of the device entrance opening having a width that is greater than a width of the bridge opening portion.

In yet another embodiment, a vehicle includes a vehicle assembly component and a personal weather protector device holder having a device entrance opening provided in the vehicle assembly component. The personal weather protector device holder provides a device holding volume that receives a personal weather protector device through the device entrance opening. The device entrance opening includes a first enlarged opening portion, a second enlarged opening portion and a bridge opening portion that intersects the first enlarged opening portion and the second enlarged opening portion. The first enlarged opening portion and the second enlarged opening portion each sized to receive an umbrella therethrough. The bridge opening portion being narrower than the first enlarged portion and the second enlarged portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to personal weather protector device holders for vehicles that can hold personal weather protector devices, such as umbrellas and snow brushes. The personal weather protector device holders may be integrated into various vehicle assembly components, such as behind a vehicle panel or within a vehicle door. The personal weather protector device holders include a device entrance opening having multiple enlarged opening portions connected by a relatively narrow bridge opening portion. As will be described in greater detail below, such an arrangement can allow for holding multiple personal weather protector devices, such as umbrellas, within the personal weather protector device holders and/or may allow for holding orthogonal-shaped personal weather protector devices, such as a snow brush that has bristles that extend orthogonally to a handle.

Figure 1:
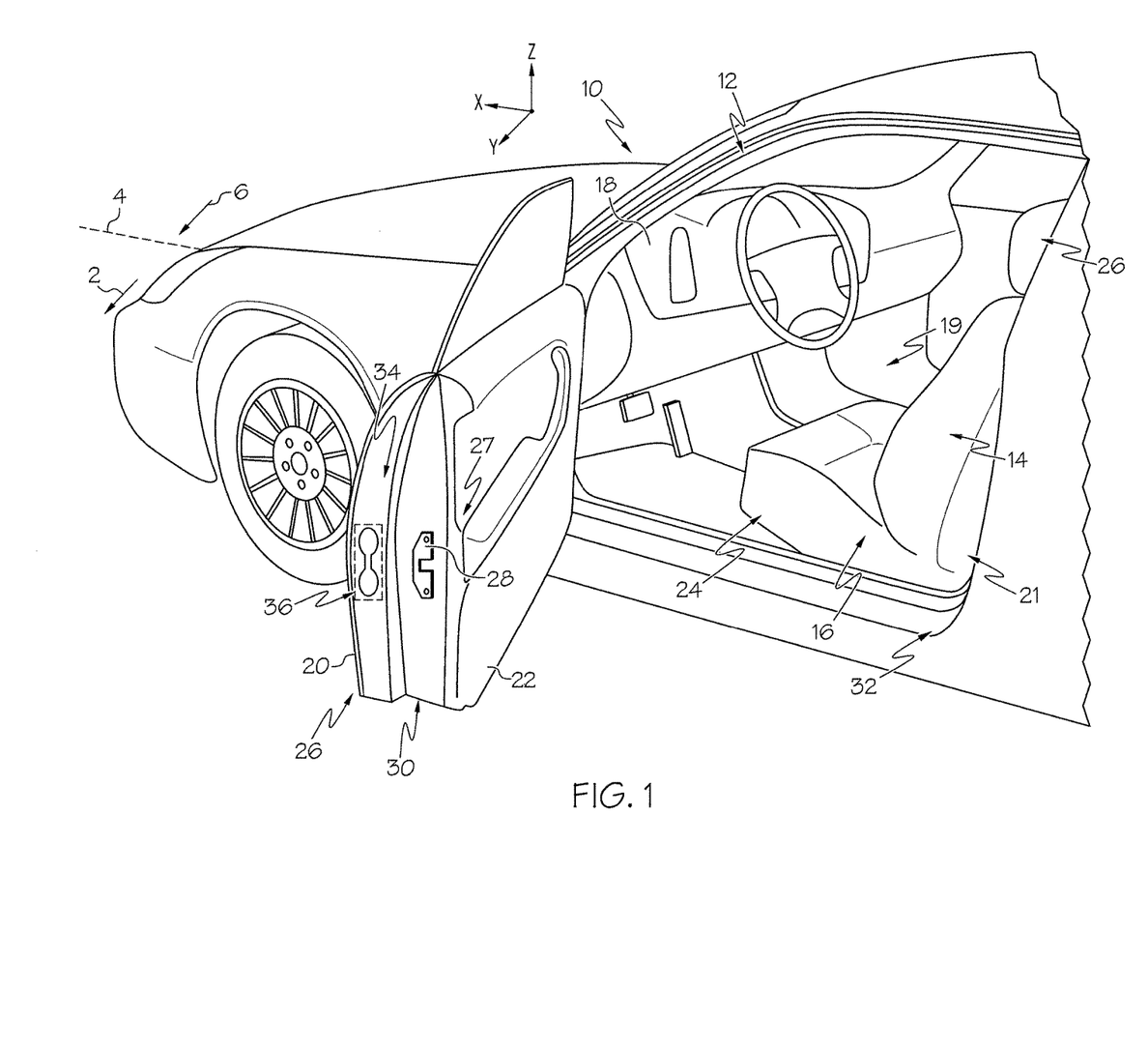
FIG. 1 is a side partial view of a vehicle including a personal weather protector device holder, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

In FIG. 1, selected portions of the vehicle 10 are illustrated. The vehicle 10 generally includes a vehicle body 12 with a vehicle seat assembly 14 located therein including a vehicle seat 16 located rearward of an instrument panel 18 within an occupant seating area 19. The vehicle seat 16 includes a seat back structure 21 and a seat base structure 24. In some embodiments, the seat back structure 21 may move (e.g., rotate or pivot) relative to the seat base structure 24 to a variety of angular positions relative thereto and be releasably locked into place at a desired location via manual and/or automatic operation.

The vehicle 10 further includes a vehicle door 26. The vehicle door 26 may include an outer panel 20 and an inner panel 22 that is connected to the outer panel 20 to define a volume therebetween. The outer panel 20 may be an outer visible panel of the vehicle body 12, while the inner panel 22 may be an interior door trim panel that is visible from inside the vehicle 10. A door latch assembly 27 may be located at least partially within the volume between the outer panel 20 and the inner panel 22 of the vehicle door 26. The door latch assembly 27 may include a door latch 28 that is located at a shut face panel 30 that is located between the outer panel 20 and the inner panel 22. As used herein, "shut face panel" of a vehicle door refers to any panel located between the outer panel 20 and the inner panel 22 of the vehicle door 26 that shuts against vehicle frame 32 with the vehicle door 26 in a closed position and may be formed of multiple panels, surfaces and/or various geometrical contours depending on the vehicle door design.

A personal weather protector device holder 34 is at least partially located in the vehicle door 26. In particular, a device entrance opening 36 is provided at the shut face panel 30 of the vehicle door 26. With this arrangement, the personal weather protector device holder 34 may only be accessed with the vehicle door 26 in the open position, as illustrated by FIG. 1. In the closed position, the shut face panel 30 closes against a B-pillar of a vehicle frame 32, with the device entrance opening 36 being inaccessible.

Figure 2:
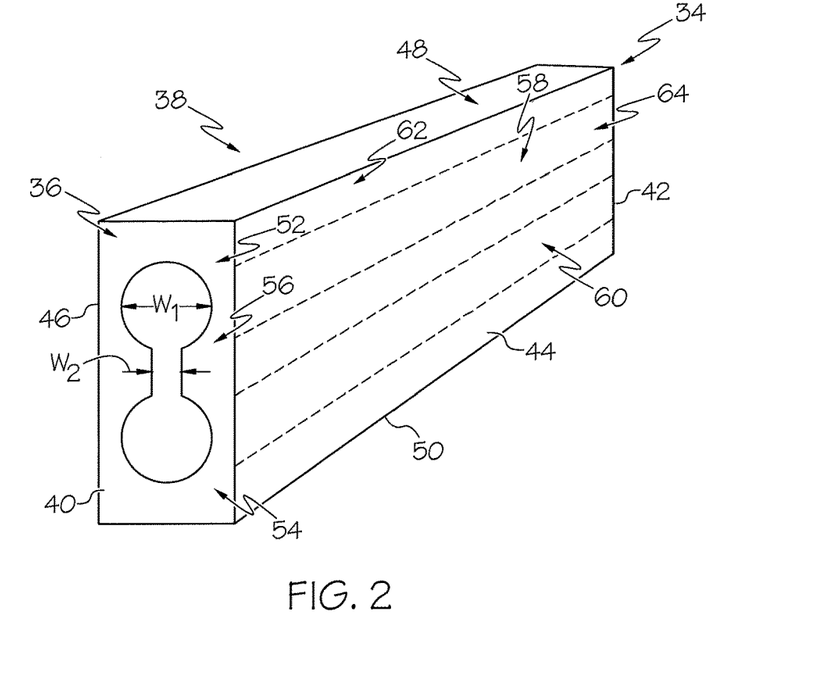
FIG. 2 is a schematic illustration of the personal weather protector device holder for use with the vehicle of FIG. 1, according to one or more embodiments shown and described herein.

Referring to FIG. 2, the personal weather protector device holder 34 may include a device holder housing 38. The device holder housing 38 may include a front wall 40, a rear wall 42, opposite side walls 44 and 46, top wall 48 and bottom wall 50 thereby forming an enclosure. The device holder housing 38 may be formed separately from the vehicle door 26 and connected thereto. In some embodiments, the device holder housing 38 may be at least partially formed as part of the vehicle door 26. As an example, the front wall 40 of the personal weather protector device holder 34 may be formed by the shut face panel 30 (FIG. 1) and the remaining walls of the device holder housing 38 then connected to the shut face panel 30.

For purposes of description, the device holder housing 38 of the personal weather protector device holder 34 is shown as including the device entrance opening 36 at the front wall 40. As mentioned above, the shut face panel 30 may form the device entrance opening 36. In some embodiments, both the front wall 40 of the device holder housing and the shut face panel 30 may each include a device entrance opening 36, which may be the same size and shape, similar or even different sizes and shapes.

Referring still to FIG. 2, the device entrance opening 36 includes enlarged opening portions 52 and 54 that are located on opposite sides of a bridge opening portion 56 that interconnects each of the enlarged opening portions 52 and 54 to provide a continuous device entrance opening 36. By "continuous device entrance opening," it is meant that the enlarged opening portions 52 and 54 and the bridge opening portion 56 are connected together without interruption. In some embodiments, a width $W_1$ of the enlarged opening portions 52 and 54 may be at least about 1.5 times a width $W_2$ of the bridge opening portion 56, such as at least about two times the width $W_2$ of the bridge opening portion 56. Widths $W_1$ of the enlarged opening portions 52 and 54 may be substantially the same, or they may be different.

Each enlarged opening portion 52 and 54 is round in shape and may form a substantially circular shape that is intersected at one side by the bridge opening portion 56. While the enlarged opening portions 52 and 54 are shown as circular, they may be any other suitable shape, such as polygonal. The bridge opening portion 56 may form a polygonal shape, such as a rectangle and intersects both enlarged opening portions 54 and 54. The bridge opening portion 56 may likewise be any suitable shape, such as rounded. Enlarged channel portions 58 and 60 may be provided to extend the enlarged opening portions 52 and 54, respectively, lengthwise through a device holding volume 62 provided by the device holder housing 38. A bridge channel portion 64 may be provided to extend the bridge opening portion 56 lengthwise through the device holding volume 62. The bridge channel portion 64 can also interconnect the enlarged channel portions 58 and 60, thereby providing a continuous, interconnected channel in the cross-sectional shape of the device entrance opening 36 (see also FIG. 11).

Figure 3:
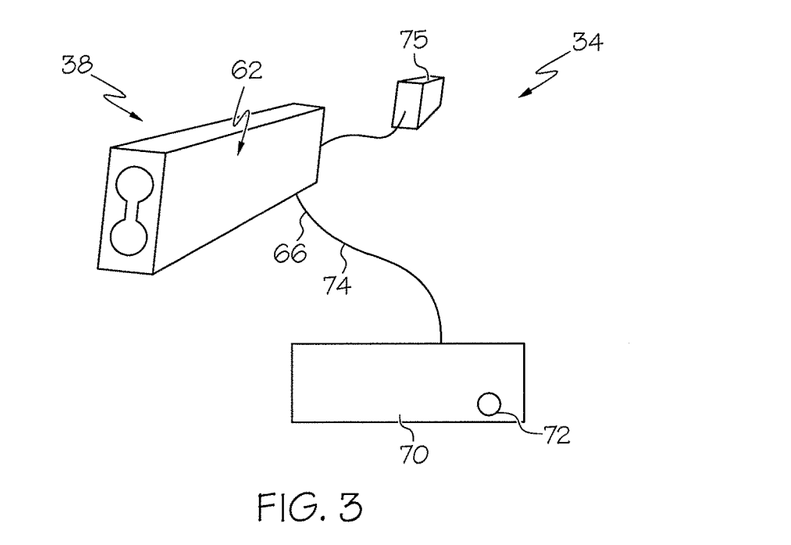
FIG. 3 is another schematic illustration of the personal weather protector device holder for use with the vehicle of FIG. 1, according to one or more embodiments shown and described herein.

Referring to FIG. 3, in some embodiments, the personal weather protector device holder 34 may include the device holder housing 38 that is arranged and configured facilitate draining of the device holding volume 62 during use. In these embodiments, the device holder housing 38 may be provided with a drain outlet 66 that can be located at a suitable location on the device holding volume 62, such as at a low-lying region to facilitate draining of liquid, sediment and other materials from the device holder housing 38. In some embodiments, the personal device holder housing 38 may be connected (e.g., by a conduit 74) or otherwise drain to a liquid collection tray 70 having an outlet 72 that can drain to an exterior of the vehicle 10 (FIG. 1). In some embodiments, the device holder housing 38 may drain directly to an exterior of the vehicle 10.

In some embodiments, the personal weather protector device holder 34 may include an actuator 75. The actuator 75 may be used to extend a personal weather protector device that is housed by the weather protector device holder 34. For example, the actuator 75 may include a spring that may be able to extend the personal weather protector device such that a handle is graspable from outside the weather protector device holder 34. In another embodiment, the actuator may be used to extend the device holder housing 38 with or without the personal weather protector device for a stowing or removing operation. In still some embodiments, the actuator 75 may include an electric motor that can be used to automatically extend and retract the personal weather protector device and/or device holder housing 38, for example, based upon an operator command (e.g., a key fob or other user interface located inside and/or outside of the vehicle).

Figure 4:
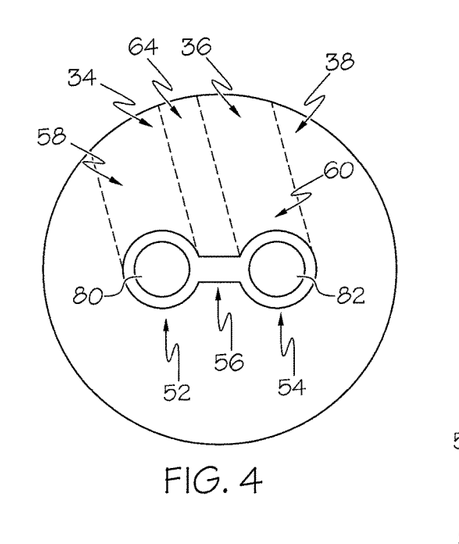
FIG. 4 is a schematic illustration of a device entrance opening of a personal weather protector device holder holding multiple personal weather protector devices, according to one or more embodiments shown and described herein.
Figure 5:
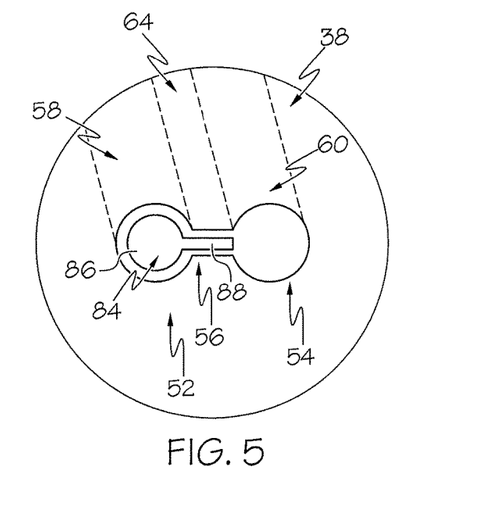
FIG. 5, is a schematic illustration of a device entrance opening of a personal weather protector device holder holding another personal weather protector device, according to one or more embodiments shown and described herein.

FIGS. 4 and 5 illustrate various operations of the personal weather protector device holder 34. Referring first to FIG. 4, the device entrance opening 36 includes the enlarged opening portions 52 and 54 and corresponding enlarged channel portions 58 and 60 that can each be sided to receive a somewhat round-shaped personal weather protector device, such as umbrellas 80 and 82, for example, in stowed configurations. The bridge opening portion 56 and corresponding bridge channel portion 64 can have reduced dimensions to maintain separation between the umbrellas 80 and 82, while also facilitating passage of water from the enlarged channel portion 58 to the enlarged channel portion 60 to facilitate draining of water from the device holding volume 62, as described above.

Umbrella size is usually measured along an arc, over its canopy. Measurement can be taken as the distance from one tip to the opposite tip and over the umbrella's canopy. Some golf-type umbrellas may have an arc of 58 inches to 62 inches and even up to 68 inches. Smaller umbrellas may have between 40 inches and 48 inches of arc. The enlarged opening portions 52 and 54 and enlarged channel portions 58 and 60 can be sized to receive any standard size rain or golf umbrella, for example, between about 40 inches or smaller and about 70 inches or larger. Further, the bridge opening portion 56 and bridge channel portion 64 can be sized to inhibit passing of the umbrellas from one enlarged channel portion 58, 60 to the other enlarged channel portion 58, 60.

Referring to FIG. 5, while multiple personal weather protector devices may be housed within the device holder housing 38, the bridge opening portion 56 of the device entrance opening 36 and corresponding bridge channel portion 64 can be sized to accommodate other device shapes, such as a snow brush 84. The snow brush 84 is orthogonal-shaped having an axially extending handle portion 86 and an orthogonally extending brush portion 88. The enlarged opening portions 52 and 54 and corresponding enlarged channel portions 58 and 60 can be sized to receive the handle portion 86 of the snow brush 84, but not the brush portion 88. However, the bridge opening portion 56 and bridge channel portion 64 can be sized to receive both the handle portion 86 and the brush portion 88.

Figure 6:
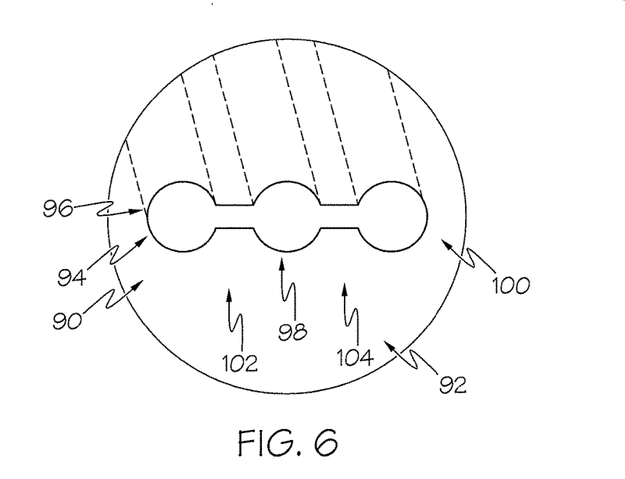
FIG. 6 is a schematic illustration of another embodiment of a device entrance opening, according to one or more embodiment shown and described herein.

While a pair of enlarged opening portions 52 and 54 and a bridge opening portion 56 are shown above, there may be additional enlarged opening portions and bridge opening portions. Referring briefly to FIG. 6, another embodiment of a personal weather protector device holder 90 may include a device holder housing 92 having a device entrance opening 94 with three or more enlarged opening portions 96, 98 and 100 inter connected by bridge opening portions 102 and 104 with their corresponding channels as described above.

Figure 7:
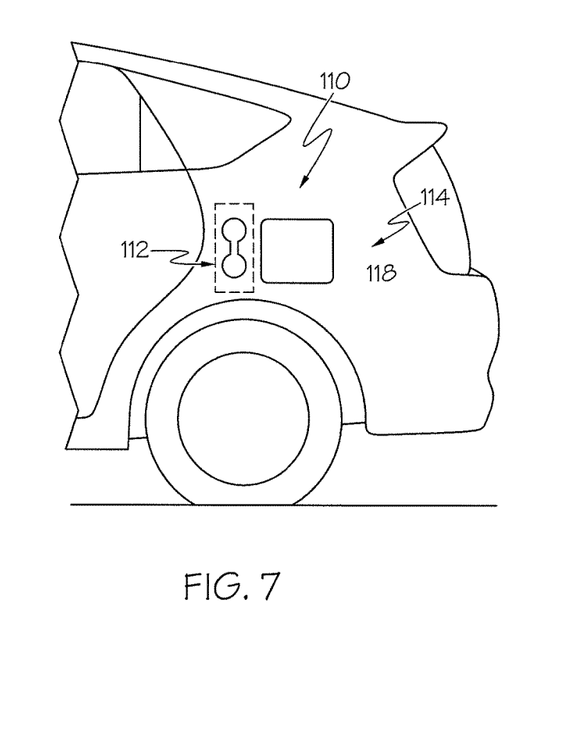
FIG. 7 is a side partial view of a vehicle including another personal weather protector device holder, according to one or more embodiments shown and described herein.

FIGS. 7-10 show embodiments of personal weather protector device holders located at various locations on a vehicle body to illustrate locations where a user might find such personal weather protector device holders convenient. The embodiments illustrated by FIGS. 7-10 are merely illustrative as other locations may be provided for the personal weather protector device holders depending, for example, on the type of vehicle. Referring first to FIG. 7, a personal weather protector device holder 110 includes a device entrance opening 112 that is provided at a rear side panel 114 of vehicle 116, near a fuel door 118. The personal weather protector device holder 110 may include any one of more of the components described above. The personal weather protector device holder 110 may provide a convenient location for a personal weather protector device, for example, during a fueling operation.

Figure 8:
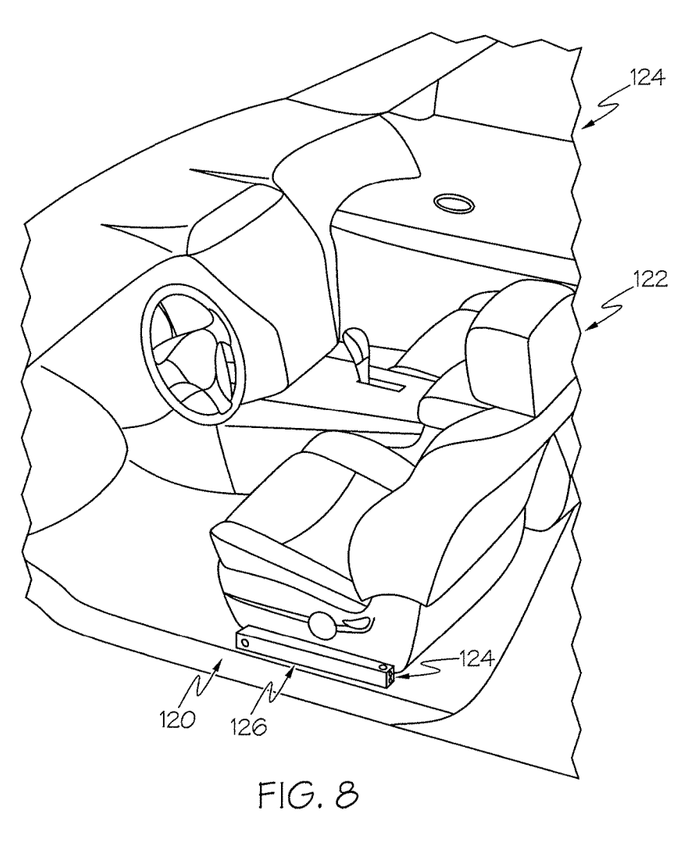
FIG. 8 is a side partial view of a vehicle including another personal weather protector device holder, according to one or more embodiments shown and described herein.

Referring to FIG. 8, another embodiment of a personal weather protector device holder 120 is provided next to a driver front vehicle seat 122 for access by a driver of vehicle 124. To illustrate, the personal weather protector device holder 120 may include a device holder housing 126 that is similar to the device holder housing 38 of FIG. 2. The device holder housing may include a device entrance opening 128 as described above. In some embodiments, the personal weather protector device holder 120 may be movably connected at the location next to the driver front vehicle seat 122 to facilitate access to the personal weather protector device housed therein. In some embodiments, the personal weather protector device holder 120 may be removable from the vehicle 124, for example, as a tote, for a cleaning operation, etc.

Figure 9:
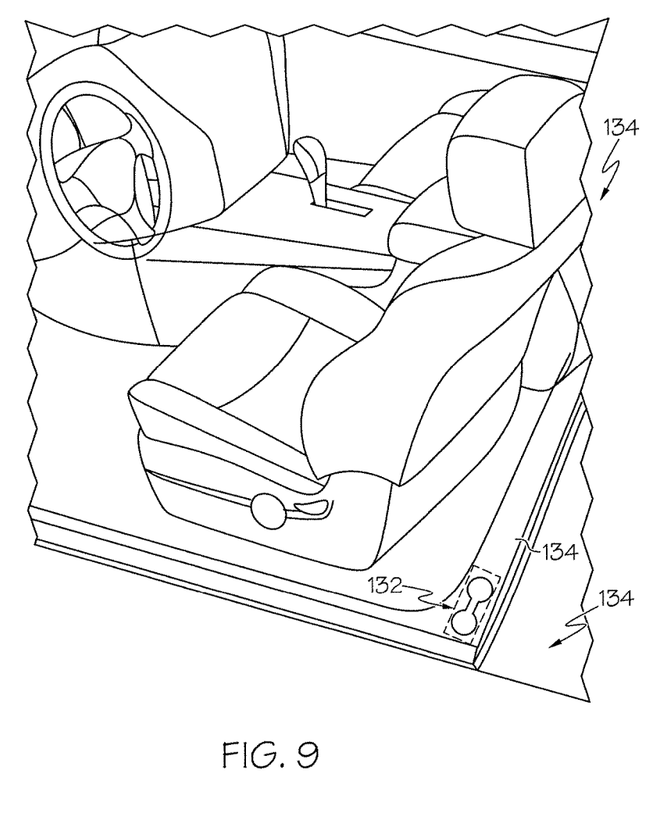
FIG. 9 is a side partial view of a vehicle including another personal weather protector device holder, according to one or more embodiments shown and described herein.

Referring to FIG. 9, another embodiment of a personal weather protector device holder 130 includes a device entrance opening 132 is provided at a shut face panel 134 located at a support pillar 136 (e.g., a B pillar located between a front vehicle door and a rear vehicle door). The personal weather protector device holder 130 may be accessible only with the front vehicle door in an open position as shown and may include any one of more of the components described above. The personal weather protector device holder 130 may provide a convenient location for a personal weather protector device when exiting vehicle 138.

Figure 10:
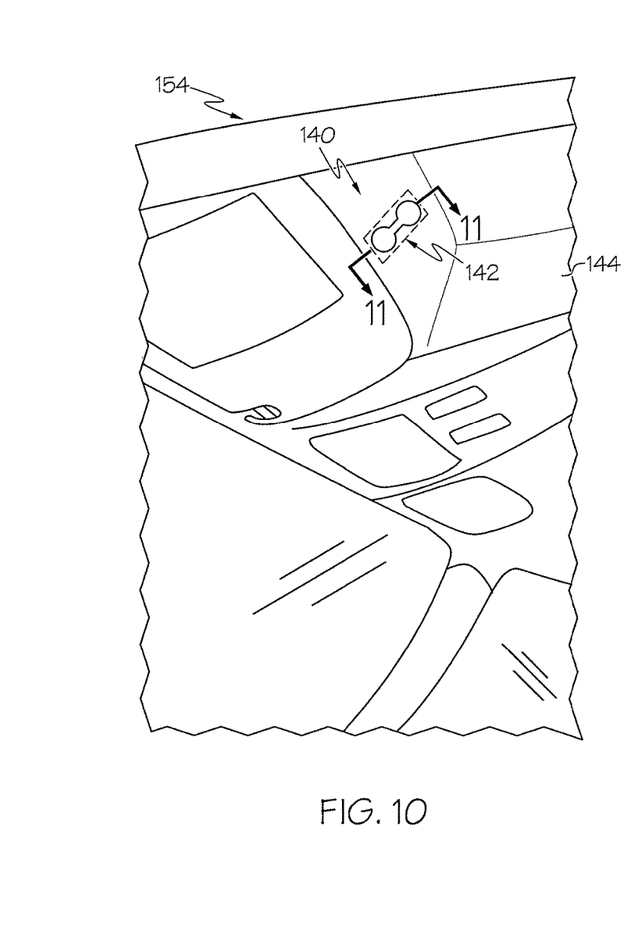
FIG. 10 is an interior partial view of a vehicle including a personal weather protector device holder, according to one or more embodiments shown and described herein.
Figure 11:
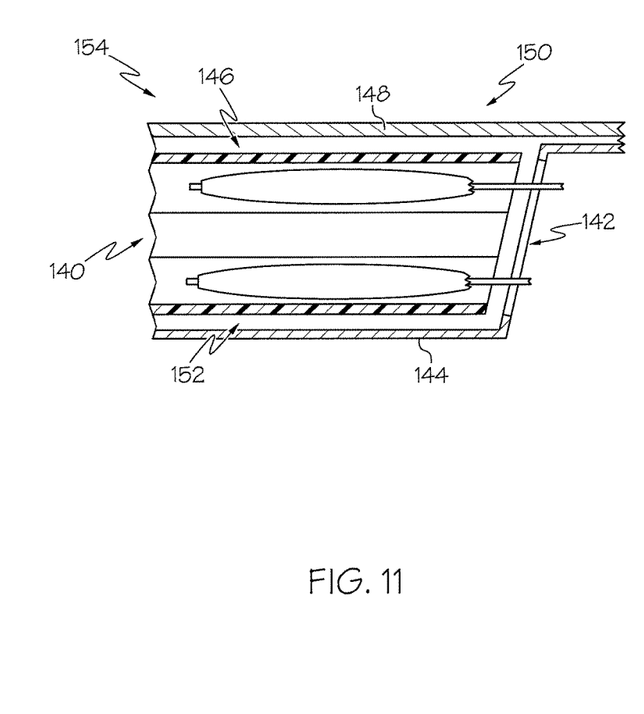
FIG. 11 is a section view of the vehicle including a personal weather protector device holder along line 11-11 of FIG. 10, according to one or more embodiments shown and described herein.

Referring to FIG. 10, another embodiment of a personal weather protector device holder 140 includes a device entrance opening 142 that is provided at a headliner 144. Referring briefly to FIG. 11, a volume 146 may be provided between the headliner 144 and an outer roof panel 148 of a vehicle roof assembly 150 in which a device holder housing 152 may be provided. The personal weather protector device holder 130 may provide a convenient location for a personal weather protector device when exiting vehicle 138.

The above-described personal weather protector device holders can provide a holding location for multiple axial personal weather protector devices, such as umbrellas, or for orthogonal-shaped personal weather protector devices, such as a snow brush. The personal weather protector device holders include a device entrance opening that includes enlarged opening portions that are connected by a narrower bridge opening portion. The bridge opening portion can inhibit movement of the personal weather protector devices from their respective enlarged opening portions, while providing enough space for bristles of a brush. The personal weather protector device holders can be packages in an area of the vehicle that is both convenient and stowed away until needed. The personal weather protector device holders can also drain water and sediment away from the interior of the vehicle and toward the exterior, The personal weather protector device holders may also be retractable for convenient retrieval (e.g., similar to a stylus).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a vehicle assembly component;
a personal weather protector device holder having a device entrance opening provided in the vehicle assembly component, the personal weather protector device holder providing a device holding volume that receives a personal weather protector device through the device entrance opening; and
an actuator that moves the personal weather protector device holder including device entrance opening between an extended configuration, extended outwardly from the vehicle assembly component and a retracted configuration, retracted into the vehicle assembly component;
wherein the device entrance opening includes an enlarged opening portion and a bridge opening portion that intersects the enlarged opening portion, the enlarged opening portion of the device entrance opening having a width that is greater than a width of the bridge opening portion, the enlarged opening portion and the bridge opening portion sharing a same, closed perimeter that defines a continuous device entrance opening.

2. The vehicle of claim 1, wherein the device entrance opening includes another enlarged opening portion, the bridge opening portion intersects the another enlarged opening portion.

3. The vehicle of claim 2, wherein the another enlarged opening portion has a width that is greater than a width of the bridge opening portion.

4. The vehicle of claim 3, wherein the enlarged opening portion and the another enlarged opening portion both have the widths that are at least 1.5 times greater than the width of the bridge opening portion.

5. The vehicle of claim 1, wherein the enlarged opening portion of the device entrance opening is sized to receive an umbrella therethrough.

6. The vehicle of claim 1, wherein the personal weather protector device holder includes a drain outlet arranged to direct liquid flow from the device holding volume to an exterior of the vehicle.

7. The vehicle of claim 1, wherein the enlarged opening portion of the device entrance opening having the width that is at least 1.5 times greater than the width of the bridge opening portion.

8. A personal weather protector device holder that connects to a vehicle assembly component, the personal weather protector device holder comprising:
a device holder housing having a device entrance opening, the device holder housing providing a device holding volume that receives a personal weather protector device through the device entrance opening;
an actuator that moves the personal weather protector device holder including device entrance opening between an extended configuration, extended outwardly from the vehicle assembly component and a retracted configuration, retracted into the vehicle assembly component;
wherein the device entrance opening includes an enlarged opening portion and a bridge opening portion that intersects the enlarged opening portion, the enlarged opening portion of the device entrance opening having a width that is greater than a width of the bridge opening portion, the enlarged opening portion and the bridge opening portion sharing a same, closed perimeter that defines a continuous device entrance opening;
wherein the bridge opening portion has a first end intersecting the enlarged opening portion and a second end opposite the first end, the bridge opening portion having a first side edge and a second side edge that extend from the enlarged opening portion, the second side edge extends parallel to the first side edge from the first end to the second end, the first side edge and the second side edge both intersect the enlarged opening portion at the first end within the width of the enlarged opening portion such that the enlarged opening portion extends outwardly beyond the first side edge and the second side edge in a widthwise direction;
wherein the enlarged opening portion defines an enlarged channel portion that extends lengthwise through the device holding volume provided by the device holder housing and the bridge opening portion defines a bridge channel portion having parallel sidewalls that extends lengthwise through the device holding volume.

9. The personal weather protector device holder of claim 8, wherein the device entrance opening includes another enlarged opening portion, the bridge opening portion intersects the another enlarged opening portion.

10. The personal weather protector device holder of claim 9, wherein the another enlarged opening portion has a width that is greater than a width of the bridge opening portion.

11. The personal weather protector device holder of claim 10, wherein the enlarged opening portion and the another enlarged opening portion both have the widths that are at least 1.5 times greater than the width of the bridge opening portion.

12. The personal weather protector device holder of claim 8, wherein the enlarged opening portion of the device entrance opening is sized to receive an umbrella therethrough.

13. The personal weather protector device holder of claim 8, wherein the device holder housing includes a drain outlet arranged to direct liquid flow therefrom.

14. The personal weather protector device holder of claim 8, wherein the enlarged opening portion of the device entrance opening has the width that is at least 1.5 times greater than the width of the bridge opening portion.

15. A vehicle comprising:
a vehicle assembly component;
a personal weather protector device holder having a device entrance opening provided in the vehicle assembly component, the personal weather protector device holder providing a device holding volume that receives a personal weather protector device through the device entrance opening; and
an actuator that moves the personal weather protector device holder including device entrance opening between an extended configuration, extended outwardly from the vehicle assembly component and a retracted configuration, retracted into the vehicle assembly component;

wherein the device entrance opening includes a first enlarged opening portion, a second enlarged opening portion and a bridge opening portion that intersects the first enlarged opening portion and the second enlarged opening portion, the first enlarged opening portion and the second enlarged opening portion each sized to receive an umbrella therethrough, the bridge opening portion being narrower than the first enlarged portion and the second enlarged portion, the first enlarged opening portion, the second enlarged opening portion and the bridge opening portion sharing a same, closed perimeter that defines a continuous device entrance opening;

wherein the bridge opening portion has a first end intersecting the first enlarged opening portion and a second end opposite the first end intersecting the second enlarged opening portion, the bridge opening portion having a first side edge and a second side edge that extend from the first enlarged opening portion, the second side edge extends parallel to the first side edge from the first end to the second end, the first side edge and the second side edge both intersect the first enlarged opening portion at the first end within a width of the first enlarged opening portion and the second enlarged opening portion within a width of the second enlarged opening portion such that the first and second enlarged opening portions extend outwardly beyond the first side edge and the second side edge in a widthwise direction;

wherein the first enlarged opening portion defines an enlarged channel portion that extends lengthwise through the device holding volume provided by the device holder and the bridge opening portion defines a bridge channel portion having parallel sidewalls that extends lengthwise through the device holding volume.

16. The vehicle of claim 15, wherein the first enlarged opening portion and the second enlarged opening portion both have the width that is at least 1.5 times greater than a width of the bridge opening portion.

17. The vehicle of claim 15, wherein the device entrance opening is accessible by a user only with a vehicle door in an open position.

18. The vehicle of claim 15, wherein the personal weather protector device holder includes a drain outlet arranged to direct liquid flow from the device holding volume to an exterior of the vehicle.

* * * * *